June 16, 1959
H. ROSEN
2,890,559
CARTON HANDLING AND SEALING MACHINE
Filed June 17, 1958
2 Sheets-Sheet 2
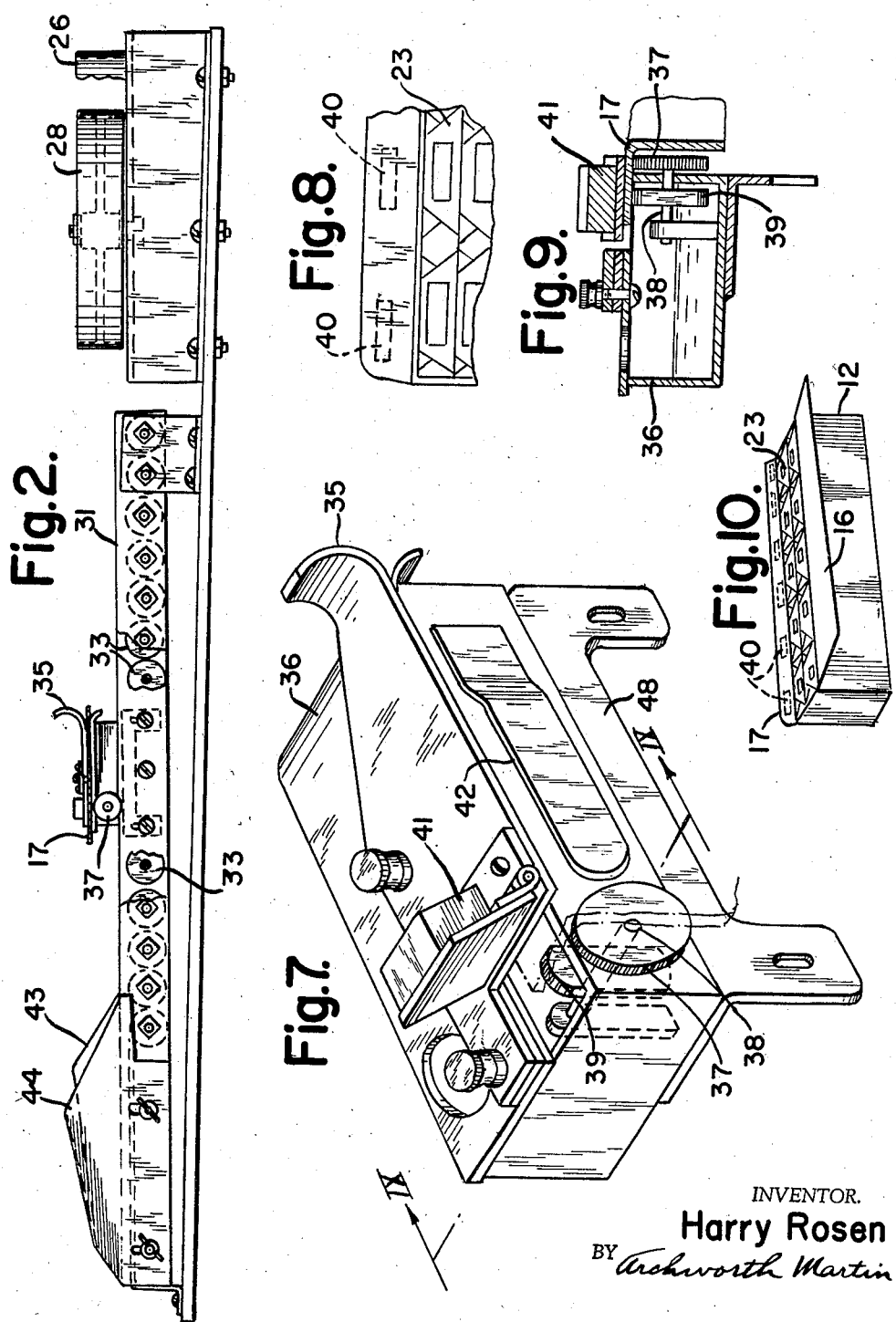
INVENTOR.
Harry Rosen
BY Archworth Martin
ATTORNEY United States Patent Office 2,890,559
Patented June 16, 1959

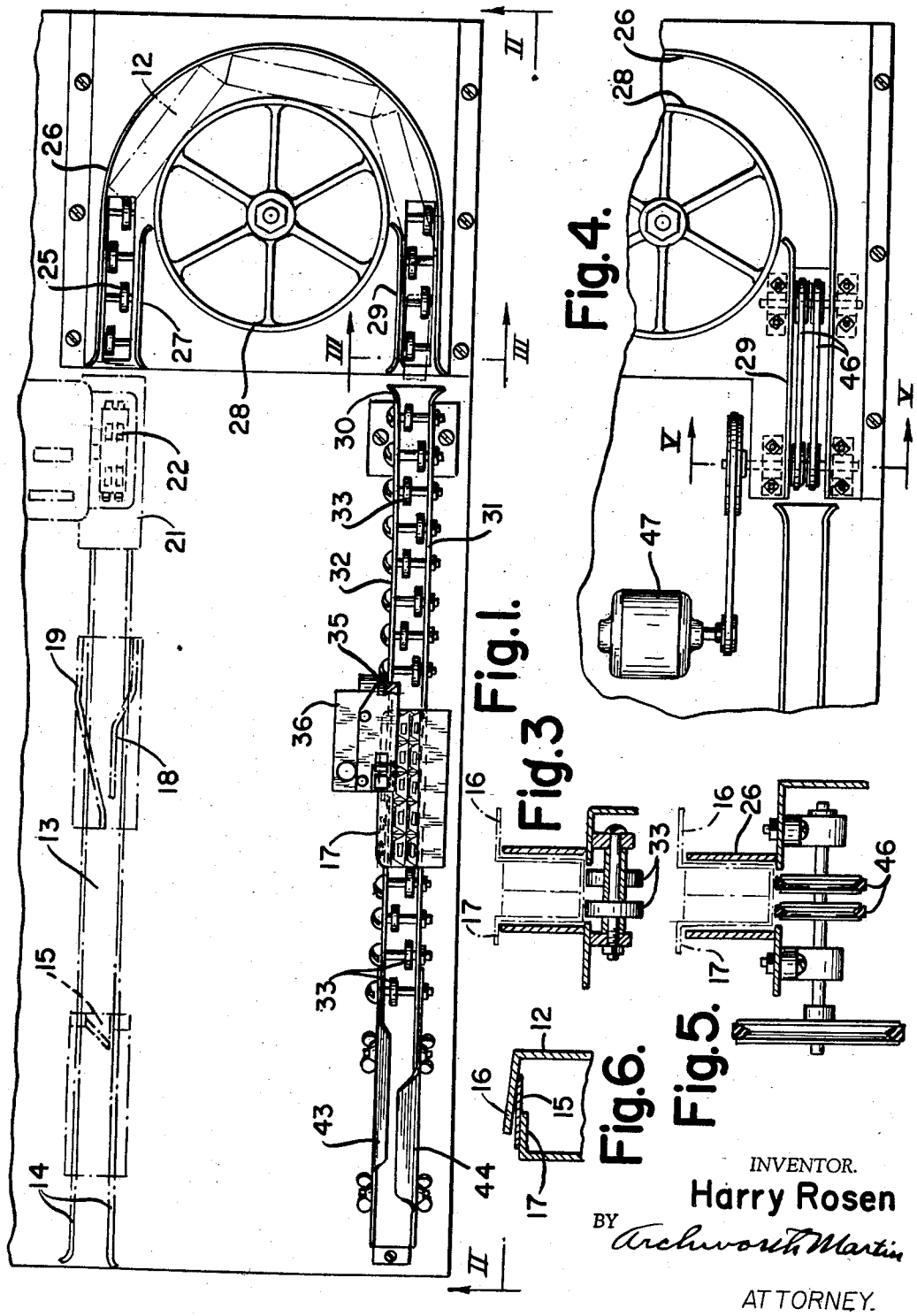

2,890,559
CARTON HANDLING AND SEALING MACHINE
Harry Rosen, Wilkinsburg, Pa.
Application June 17, 1958, Serial No. 742,525
4 Claims. (Cl. 53—383)

My invention relates to apparatus for handling cartons which contain packages and particularly apparatus for use in imprinting metered tax figures on the ends of packages contained within the cartons, without removing the packages from the cartons.

Cigarettes when produced at the factories are placed in packages which are sold over the retail counter or from dispensing machines, to individual customers. These packages are placed in cartons which are shipped nationwide, some of them going into States where tax is required on each package sold at retail. To facilitate sales of these packages to the eventual customers in such tax States, either across the counter or through vending machines, the manufacturer or distributor will in many cases subject the individual packages to an officially sealed metered imprinting device for impressing the amount of the State tax on each package.

This operation is usually performed by distributors in the respective States where such tax is required. To this end, the distributor will open the carton to expose the ends of cigarette packages contained therein, and pass the open packages through a metered tax imprinting machine that will imprint upon each package the amount of tax. One machine for doing this is described and shown in Pat. No. 2,090,919, dated August 24, 1937, issued to Strother et al. After the imprinting operation, the cartons are moved along a guide-way or conveyor line near the other end of which the upper ends of the cartons have to be closed and resealed, after which they are placed in cases such as those from which they were removed preliminary to imprinting them.

This line of operations requires an operator to remove the cartons from the cases and start them on their way past opening devices, the imprinting machine and reclosing and sealing apparatus. At the other end of the line, the operator will remove the resealed cartons and place them in cases for shipment to the customers in the taxing States. This requires two operators, because the operator who removes the cartons from the assembly line is too far away from the beginning of the line to start the cartons on their way.

My invention has for its object the provision of an apparatus whereby one operator can move the cartons one by one into the guideway at the beginning of the line of operations and also remove the resealed cartons at the other end of the guideway and place them in shipping cases, by reason of the fact that the guideway is of such contour that the loading and unloading of the cartons are both at locations in proximity to a single operator.

Another object of my invention is to provide a guideway of generally improved form wherein a novel device is provided for reversing the direction of travel of the cartons when moving away from and returning to the operator.

Another object of my invention is to provide an advancing force for the cartons in one leg of a U-shaped path and a supplemental advancing force to the cartons in the other leg of said path, and to provide an improved adhesive-applying device for the flaps controlled by movement of the cartons in the second-named path, in the effecting of a resealing operation on the cartons.

Figure 1 is a plan view, partly schematic, of apparatus which embodies my invention.

Fig. 2 is a side elevational view thereof.

Fig. 3 is an enlarged view taken on the line III—III of Fig. 1.

Fig. 4 is a partial plan view showing a modification of a portion of the apparatus of Fig. 1.

Fig. 5 is an enlarged view taken on the line V—V of Fig. 4.

Fig. 6 is an enlarged sectional view showing the manner in which the glued flaps of a carton are opened by a knife as the cartons are moved on to a guideway.

Fig. 7 is an enlarged perspective view of the glue applying apparatus of Fig. 2 employed in resealing the cartons after the tax imprinting has been applied.

Fig. 8 is a view showing spots of glue applied to a flap of the carton by the apparatus of Fig. 7.

Fig. 9 is a view taken on the line IX—IX of Fig. 7.

Fig. 10 shows the carton with the top flaps in open position.

As shown in Figs. 1 and 2, the cartons 12 are placed one-by-one on a slideway 13, between side rails 14, and pushed forwardly thereon by the operator, so that a knife 15 will enter between the flaps 16 and 17 thus separating the glued areas from each other. Each carton is advanced by sliding other cartons onto the slideway, so that the top flaps are first unsealed and then spread apart by fingers 18 and 19 to the fully open position shown in Fig. 10. The cartons are pushed forward by the operator until they enter upon a conveyor 21 that moves them through the tax-imprinting machine 22. This conveyor and imprinting apparatus can be of well-known conventional forms such as that shown in Pat. 2,090,919, August 24, 1957, issued to Strother et al. Likewise the splitting knife 15 and the guide fingers 18 and 19 will be of known types. The printing wheel 22 impresses the amount of tax upon the upper end of the packages 23 in the carton, as indicated at the small rectangles on the ends of the packages in Figs. 8 and 10.

The conveyor 21 advances the packages onto guide rollers 25, between side rails 26 and 27. The side rail 26 is curved to U-form and the packages are pushed along it by the imprinted rear packages from the conveyor 21.

An important feature of my invention is a wheel or drum 28 that is idlingly mounted for free rotation under the frictional drag of the packages 12 as they move along the curved guideway at 26. There is therefore a minimum of friction that would tend to deform the packages, such as would occur if the guide 27 were continuous or the drum 28 stationary. The packages are guided by the side rail 26 and a side rail 29 on to an inclined slideway 30, between side rails 31—32 in which are journaled idler rollers 33 disposed in an inclined plane. The cartons therefore tend to move rearwardly by gravity and therefore there is not as much pressure required at the conveyor 21 to advance them.

The narrow flap 17 of the carton will enter between guide plates 35 on a glue box 36 and will engage a knurled wheel 37 which is secured to a shaft 38 that has secured thereto a glueing bar 39 which rotates in the glue box 36, the ends of the bar 39 are knurled so that glueing will adhere thereto and be carried upwardly into engagement with the underside of the flap 17, to thereby provide glued areas 40. The flap 17 is held down, for the application of glue, by a hinged lid on the glue box, that carries a weight 41, which in Fig. 7 is shown in raised position, but is in lowered position in Fig. 9. This is a novel feature of my apparatus. A spring strip 42 on the side of the glue box 36 serves as a guide to prevent the ends of the cartons from catching on the wheel 37.

After the spots of glue have been applied to the flaps 17 the carton reaches the wings 43 and 44, the wing 43 turning the flap 17 into overlying relation to the adjacent row of packages, while the wing 44 turns the wider flap 16 down against the glued surfaces at 40.

The wing 43 may at times become somewhat smeared with the adhesive but can readily be removed for cleaning, through disconnection from the attaching bolts shown in Figs. 1 and 2.

The operator will then remove the cartons from the slideway and replace them in cases with his right hand while with the left hand he will be loading other cartons at 14.

The wings 43 and 44 are vertically adjustable on the conveyor frame, by loosening the wing nuts, to adapt them to either regular size or king size packages. The glue box 36 and its associated parts are similarly vertically adjustable by reason of the slot and bolt connections shown in Figs. 2 and 7, to accommodate them to packages of different heights. It would be obvious that the knife 15, the guides, 18—19, and the metered printing machine could be similarly adjusted vertically.

A modification of the structure of Figs. 1 and 2 is shown in Fig. 4 wherein, instead of having inclined idler rolls such as shown in Fig. 2, the cartons as they leave the side rail 26 and the drum 28 are advanced by belts 46 that are driven from a motor 47. Advancing travel of the cartons past the glueing and resealing mechanism is therefore not dependent upon gravity and pressure of other cartons as they leave the conveyor 21.

I claim as my invention:

1. The combination with apparatus for moving cartons having oppositely-disposed closure flaps along a guideway, with each flap projecting laterally from a side of the carton and flexibly connected thereto, of a device for applying glue to the lower surface of one projecting flap, in position to be engaged by the other flap when they are folded across the top of the carton, with the glue-containing flap below the other flap, the said device comprising a wheel in position to be engaged and frictionally driven by said one flap, during travel of a carton, a glue-containing box alongside the path of travel, a shaft journaled in the box at right angles to the path of carton travel and having one end projecting from a side of the box and firmly connected to said wheel, a glue-applying member in the box and rotated by the shaft, from a partially immersed position and engaging said lower flap surface, to apply glue thereto, the flap-engaging areas of the glue-applying member being knurled, and a weighted member which is hinged at one edge on an axis transverse to the said path of travel, in position to yieldably hold the said one flap down, for engagement by the glue-applying member.

2. A combination as recited in claim 1, wherein the glue-applying member is of non-circular contour and the portions thereof of shorter radius do not engage the flap.

3. A combination as recited in claim 1, wherein a guide plate is provided on the side of the carton in position to prevent the side of the carton from engaging the said wheel.

4. Apparatus as recited in claim 1, wherein the weighted member includes a hinged portion of the box lid that gives access to the interior of the box.

References Cited in the file of this patent

UNITED STATES PATENTS

| 639,627 | Tebbets | Dec. 19, 1899 |
| 2,095,258 | Kimball et al. | Oct. 12, 1937 |
| 2,216,884 | Kott | Oct. 8, 1940 |
| 2,579,803 | Derderian | Dec. 25, 1951 |
| 2,717,699 | Spindler et al. | Sept. 13, 1955 |